United States Patent [19]

Naffa

[11] 4,372,715

[45] Feb. 8, 1983

[54] PUNCH TYPE RELEASE LOCK

[75] Inventor: Faisal A. Naffa, Huntington Beach, Calif.

[73] Assignee: AAR Corp., Elk Grove Village, Ill.

[21] Appl. No.: 36,325

[22] Filed: May 7, 1979

Related U.S. Application Data

[63] Continuation-in-part of Ser. No. 894,135, Apr. 6, 1978.

[51] Int. Cl.³ ............................................. B60P 7/08
[52] U.S. Cl. ...................................... 410/79; 410/69; 248/503; 244/102 R
[58] Field of Search ............ 244/102 R, 137; 410/77, 410/32, 69, 79; 213/223; 248/503; 188/1 C

[56] References Cited

U.S. PATENT DOCUMENTS

| 874,150 | 12/1907 | Young | 188/1 C |
|---------|---------|-------|---------|
| 3,210,038 | 10/1965 | Bader et al. | 410/77 |
| 3,335,983 | 8/1967 | Mollow et al. | 410/32 |
| 3,933,101 | 1/1976 | Blas | 410/69 |

*Primary Examiner*—Richard A. Bertsch

*Attorney, Agent, or Firm*—Barnes, Kissell, Raisch, Choate, Whittemore & Hulbert

[57] ABSTRACT

A punch type release lock intended for use primarily in retaining load supports such as pallets in locked position in an aircraft. The lock comprises a detent mechanism which is inserted into a recess preferably at the side of the load support. A preferred form of detent mechanism comprises a pair of relatively movable elements, at least one of which is pivoted. The elements include abutments which are movable apart as the elements are inserted into the recess. When a load is applied to the pivoted detent, as for example, by a parachute extracting system, movement of the element in a direction to withdraw the element to release the load support is prevented by a load cell comprising a fuse plate and punch, in which the punch is prevented from movement by the fuse plate until attainment of a predetermined load on the pivoted detent element. At the predetermined load, the punch penetrates the fuse plate and upon penetration of the fuse plate, the punch is relatively freely movable to effectively permit the load support to move the pivoted detent element to completely release the load support.

8 Claims, 8 Drawing Figures

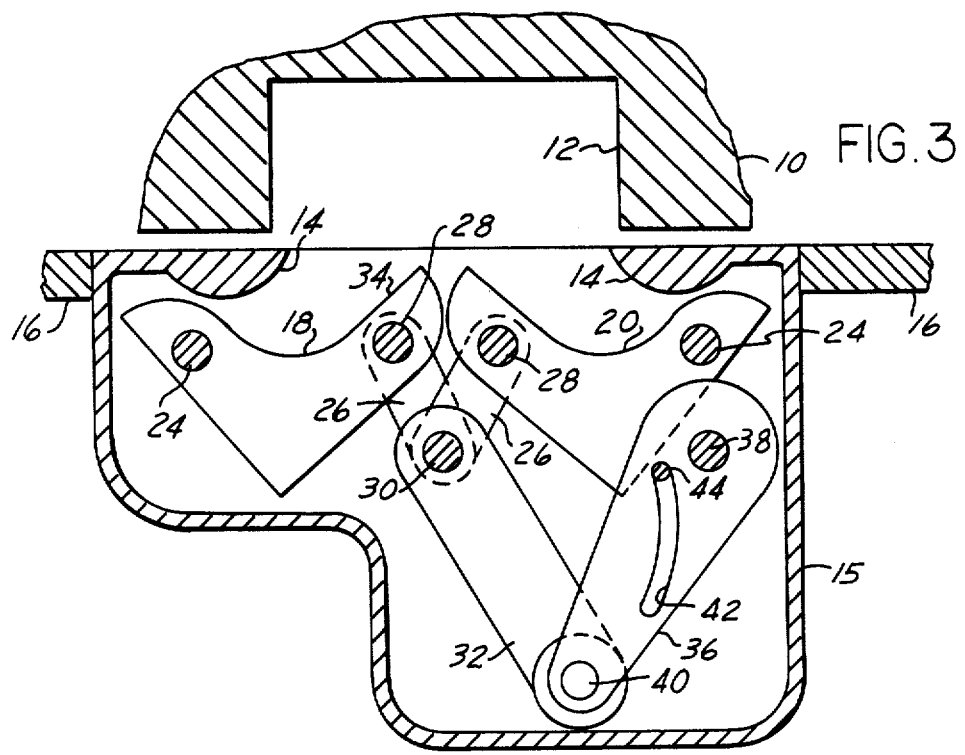
FIG. 3
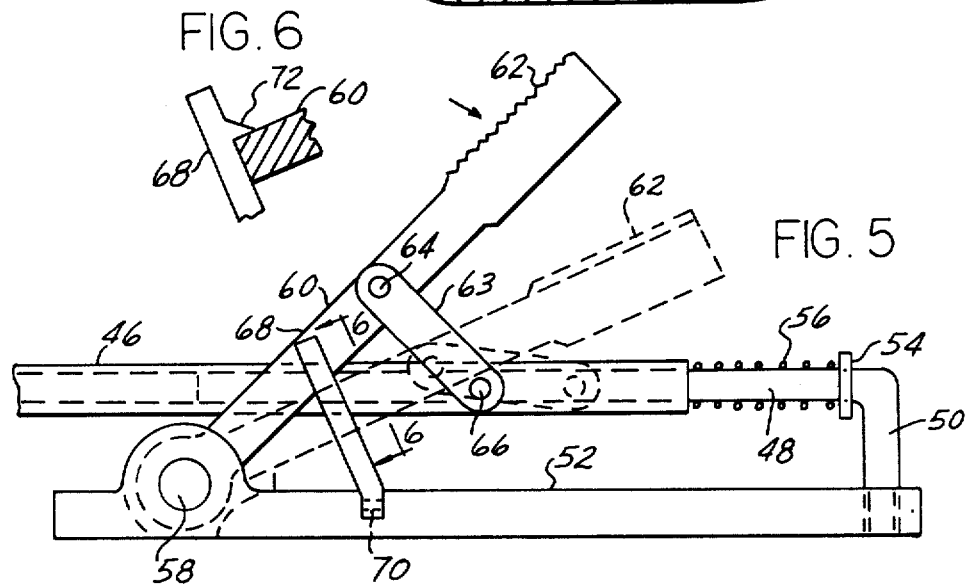
FIG. 6
FIG. 5
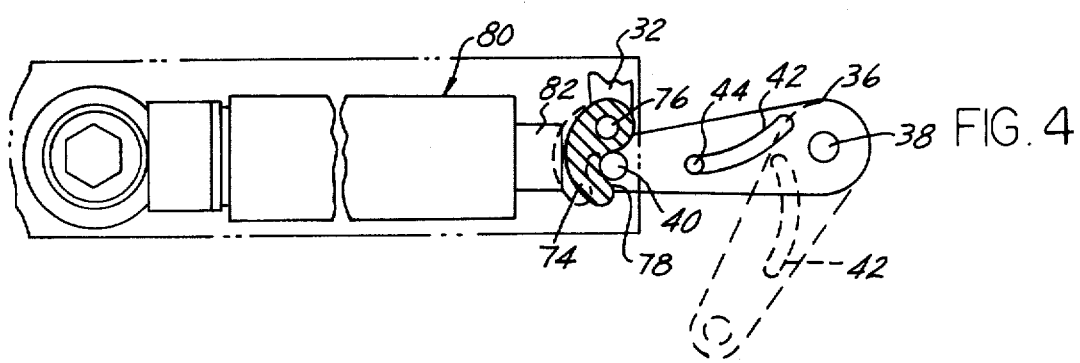
FIG. 4

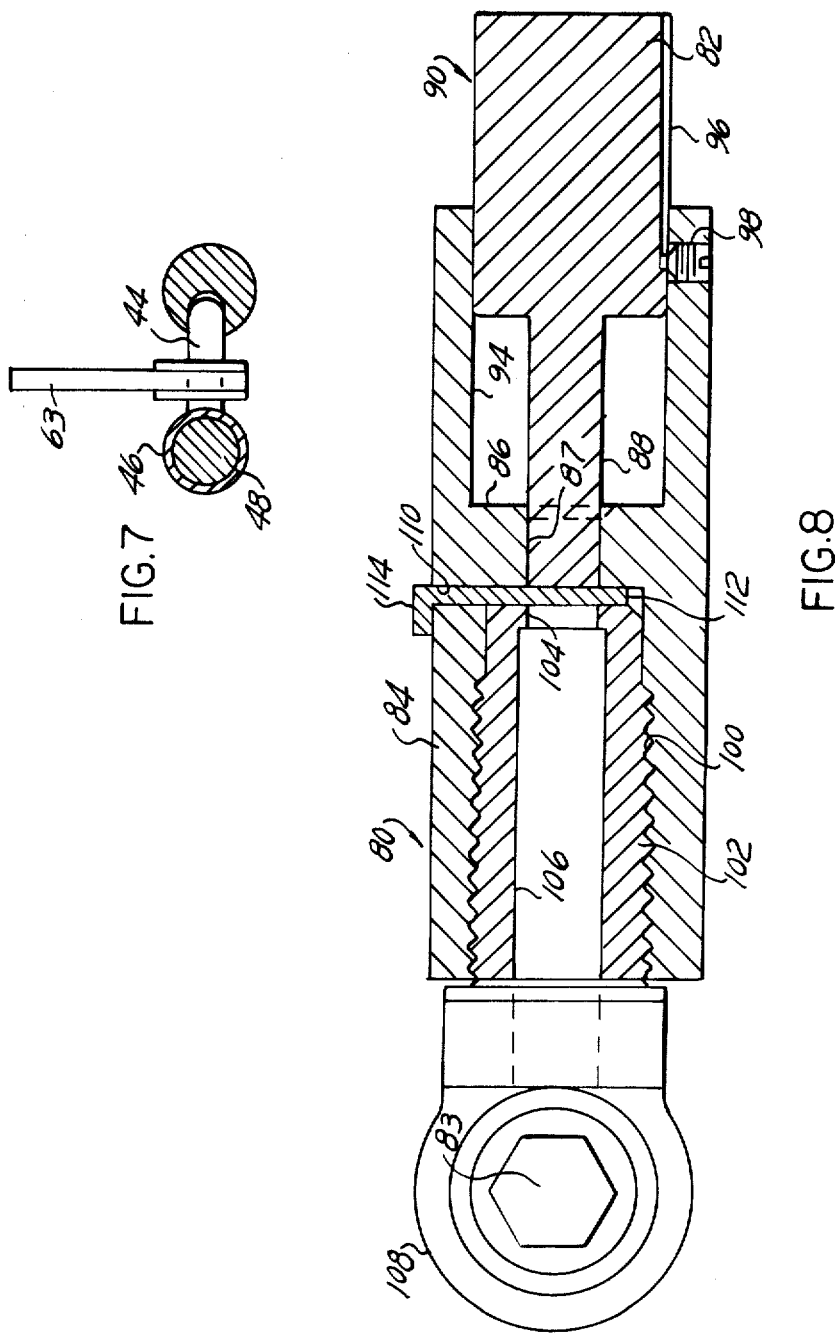

PUNCH TYPE RELEASE LOCK

CROSS REFERENCE TO RELATED APPLICATION

The present invention is a Continuation-in-Part of my co-pending application Ser. No. 894,135 filed Apr. 6, 1978.

Aerial delivery systems are known in which load supports, such as pallets or containers, are supported on the floor of an aircraft normally provided with anti-friction means such as rollers to facilitate movement of the load support over the floor into and out of loaded and locked position. The load supports are introduced into the aircraft from a side or rear door and are pushed forwardly to the final loaded position.

In loaded position the load support or pallet, which will hereinafter be referred to as a pallet, is restrained against lateral movement by elongated rails having inwardly projecting flanges overlying edge portions of the pallet, which prevent upward movement of the pallet. To retain the pallet against longitudinal movement, and particularly against movement toward the rear end of the aircraft, locking mechanism is provided which comprise detents movable into recesses normally provided at the sides of the pallet.

In a particular type of apparatus, the pallet is intended to be withdrawn through a rear doorway while the aircraft is in flight. In some cases extraction of the pallet is provided by deploying parachute means connected to the pallet behind the plane. When the parachutes are fully deployed, they exert a predetermined pull on the pallet, tending to move it toward the discharge door. It is desirable to retain the pallet in locked position until the parachutes are fully deployed and thus until a predetermined pull is applied to the pallet by a parachute.

Mechanisms of this general type are disclosed in Mollon, et al U.S. Pat. No. 3,335,983 and the present invention is an improvement over the system disclosed in the aforesaid patent.

BRIEF DESCRIPTION OF THE DRAWINGS

FIG. 3 is a view similar to FIG. 2 showing the parts in the fully released position.

FIG. 4 is a fragmentary elevational view of the load cell in association with the structure containing the detent mechanism for automatic release.

FIG. 5 is an elevational view of a foot pedal operating mechanism for controlling the lock structure.

FIG. 6 is a detailed sectional view on the line 6—6, FIG. 5.

FIG. 7 is a fragmentary sectional view on the line 7—7, FIG. 5.

FIG. 8 is an elevational view partly in section of the punch type load cell employed in the present system.

DETAILED DESCRIPTION

Figure 1:
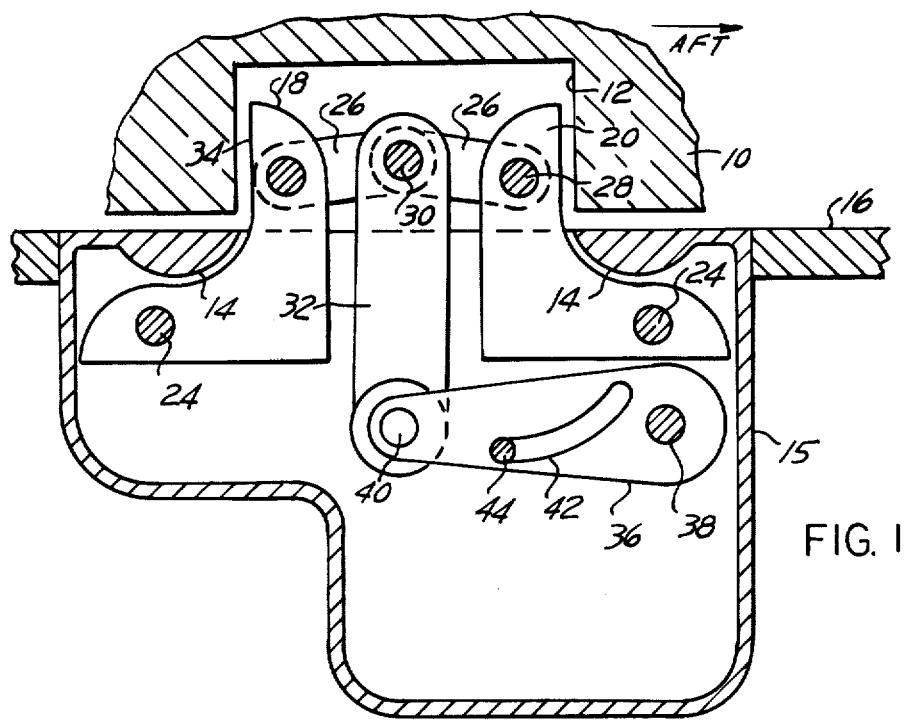
FIG. 1 is a schematic generally horizontal elevational view showing the locking mechanism in fully locked position.
Figure 2:
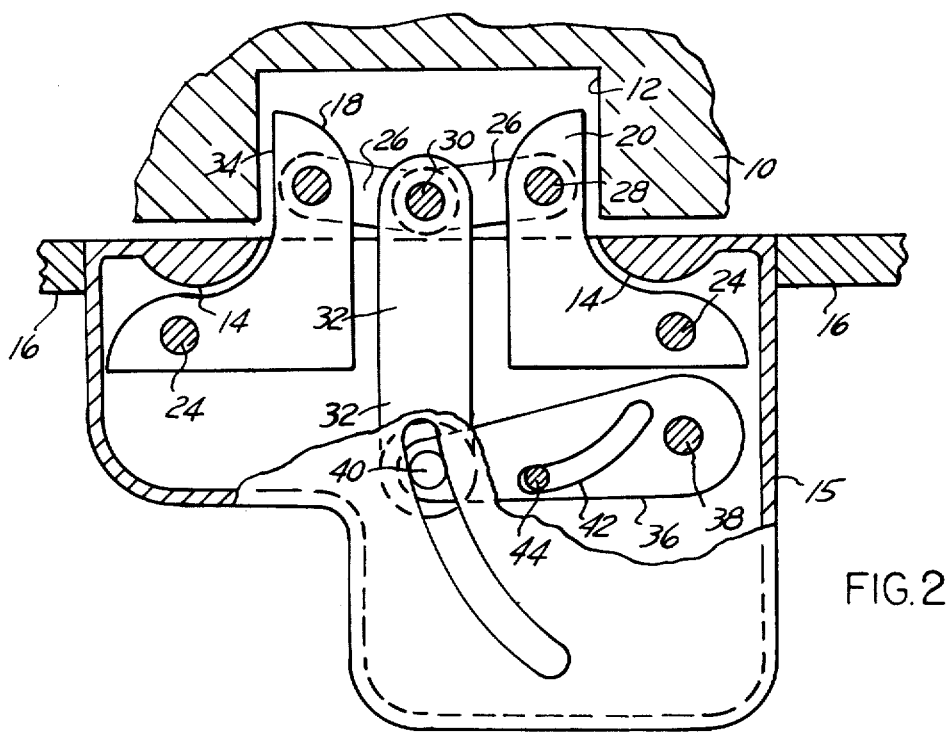
FIG. 2 is a view similar to FIG. 1 in which the detents are retained in a predetermined position capable of transmitting release forces to a load cell in accordance with pressure of the load pallet on a pivoted detent element.

Referring first to FIGS. 1, 2 and 3, the lock mechanism is intended for association with a pallet, a portion of which is indicated at 10 having a locking recess 12 in one side thereof. In practice each pallet may be provided with a plurality of locking recesses at each side thereof. It will of course be understood that instead of a simple flat pallet adapted to support a load of predetermined nature, the load support may include a partial or complete enclosure, of which the bottom wall corresponds to the pallet.

The pallet 10 is moved longitudinally of the aircraft into the position in which the recess 12 is in at least approximate alignment with opening 14 provided in a housing 15 mounted in a side rail 16. The rails 16 include inwardly extending flanges (not shown) which overlie side edge portions of the pallet and hence retain it against vertical displacement from the support floor.

A pair of detent elements 18 and 20 are pivoted within the housing 15 by separate pivot means indicated at 24. One of the detent elements such as the detent 18 is positioned to oppose movement of the pallet in the direction indicated by the arrow which is toward the rear of the aircraft.

Detents 18 and 20 are mounted for separate but interdependent movement and for this purpose are connected by toggle links 26 pivoted as indicated at 28 adjacent the movable ends of the detents. The adjacent ends of links 26 are pivotally connected to one end of an actuating link 32 by a pivot connection or pin 30. As shown, detent elements 18 and 20 are generally of L-shape and include abutment surfaces 34 adapted to engage opposite sides of the recess 12. As shown in FIG. 1 when the abutment surfaces 34 of the detents separate at approximately maximum distance, limited clearance is preferably provided at one or both sides of the detent elements to insure that the detent mechanism is movable fully into the recess 12 and movable to a positively locked over-center position.

With the parts in the position shown in FIG. 1, the pivot connection 30 between the overlapped ends of the links 26 is in an overcenter position with respect to a line joining the axes of the pivot means 28. Suitable stop means, not shown, limits movement of the links 26, the actuating link 32, or an actuating arm 36, to the illustrated position. Under these circumstances a load applied to the pallet 10, as for example by parachute mechanism urging the pallet 10 to the right in FIG. 1 or toward the after end of the aircraft, tends to rock the detent element 18 clockwise and the overcenter relationship of the links 28 as illustrated in this figure and the stop means referred to prevent such movement of the detent 18 in the direction which would release the pallet. Accordingly the pallet at this time is positively locked in its loaded position and any forces tending to move the pallet rearwardly in the aircraft are positively opposed.

The mechanism for moving the detent between the locked position illustrated in FIG. 1 and the unlocked position illustrated in FIG. 3 comprises the actuating arm 36 which is pivoted as indicated at 38 within the housing 15 and has a pivot connection by pivot pin 40 to the other end of the actuating link 32. To provide for movement of the actuating arm 36 it is provided with an elongated inclined curved slot 42 which receives a pin 44 carried by a tube 46, which as best seen in FIG. 5 is longitudinally slidable on a guide rod 48 having one end bent to extend laterally as indicated at 50 and mounted on a support plate 52. Rod 48 is provided with an abutment 54 engageable with a compression spring 56 urging the tube 46 to the left as seen in FIG. 5, which is the direction to cause pin 44 to swing arm 36 from its position illustrated in FIG. 3 to the position of FIG. 1 or from the dotted line position to the full line position of FIG. 4.

Pivoted to the support plate 52 as indicated at 58 is a locking pedal 60 having the upper surface of its end portion serrated as indicated at 62. Pedal 60 is provided with an operating link 63 pivoted as indicated at 64 to the pedal and at 66 to the tube 46. In addition a locking dog 68 is pivoted to the plate 52 as indicated at 70 and is provided with resilient means (not shown) urging the dog 68 toward pedal 60 and into engagement with the side thereof as best indicated in FIG. 6.

At the side of the dog 68 adjacent the pedal 60 is a latch element 72 having an upper camming surface and a lower latching surface as clearly illustrated in FIG. 6. When the pedal 60 is fully depressed, the dog 68 is displaced laterally by the inclined surface of the projection 72 and as soon as the shank of the pedal 60 has passed the projection, its latching surface engages the upper surface of the pedal and retains it in depressed condition against the force of compression spring 56. It will be understood that when pedal 60 is depressed, the locking mechanism illustrated in FIGS. 1, 2 and 3 is unlocked and the detents 18 and 20 withdrawn as illustrated in FIG. 3.

In order to condition the apparatus for automatic release of the load support as a result of a pull by deployed parachutes, the pivot pin 40 connecting the actuating arm 36 to the lower end of the actuating link 32 as shown in FIG. 2, is latched in the position illustrated in FIGS. 2 and 4. For this purpose there is provided a pivoted latching or blocking cam 74 seen in FIG. 4 which is pivoted within the housing 15 by pivot means indicated at 76. Cam 74 includes a recess adapted to receive the pivot pin 40 and to prevent upward movement thereof to the overcenter or positively locked position of FIG. 1. Below the pivot pin 40 the blocking cam 74 includes an inclined cam surface 78. Accordingly with the actuating arm 36 and the blocking cam 76 in the full line position of FIG. 4, forces applied to the abutment surface 34 of the detent 18 apply a downward force to the actuating link 32 which in turn applies a counterclockwise bias to the actuating arm 36. This in turn applies a force to the inclined surface 78 of the blocking cam 74 tending to rotate the cam clockwise from its illustrated position.

Clockwise movement of the blocking cam 74 is prevented at this time by a load cell indicated generally at 80 in FIG. 4, details of which are illustrated in FIG. 8.

It will be understood from an inspection of FIG. 4 that a predetermined force applied to the pin 30 will apply a corresponding predetermined force to the blocking cam 74 which in turn will apply a predetermined force to the projecting end 82 of the punch and the load cell 80.

Referring now to FIG. 8 the pressure responsive load cell 80 is illustrated in detail. As seen in this figure, the load cell comprises an elongated generally tubular housing 84 provided intermediate its ends with a transversely extended web or wall 86 having an aperture 87 to receive the inner punch portion 88 of a punch 90. The punch includes the larger portion 82 which is slidably received in the bore 94 of the housing 84. Portion 82 is grooved as indicated at 96 and receives the inner end of a stop screw 98 which prevents the punch from separating from the housing 84.

At its opposite end the housing 84 is provided with an internal thread as indicated at 100. This portion receives a threaded tubular anvil 102, the inner end of which is provided with a reduced opening 104 dimensioned to receive the inner end of the punch 88. Outwardly from the reduced opening 104, anvil 102 is provided with an enlarged through opening 106 which freely receives a plug cut from a fuse plate for ready disposal. At its outer end anvil 102 is provided with ears 108 apertured to receive a cylindrical portion of pivot 83.

Extending laterally into the interior of the housing 84 is a slot 110 dimensioned to receive a flat fuse plate or disc portion 112 having a laterally extending ear 114 to facilitate removal of the punched fuse plate after operation of the lock release mechanism and replacement of a new fuse plate therein.

The flat portion of plate 112 is inserted into the opening in the position illustrated after which the anvil is tightened down to mount the fuse plate 112 against the adjacent side of the web 86 and against the inner end of the anvil in position to have a slug punched out of it by inward movement of the punch 90.

When initial force is applied to the punch 90 by the blocking cam 74, no inward movement of the punch portion 82 is permitted, as a result of the engagement between the end of the punch portion 88 and the fuse plate 110. However, when the force attains a predetermined value, the punch abruptly penetrates the fuse plate 110 permitting substantially free movement of the blocking cam and hence of the actuating link 32 and arm 36 to provide for full displacement of the detent elements to the position illustrated in FIG. 3. This moves pin 44 and tube 46 to the right against the action of spring 56 to the dotted line position of FIG. 5.

The blocking cam 74, when not employed to condition the system for parachute release of a load pallet, can be shifted along its mounting shift 76 so that it does not interfere with upward movement of the pivot pin 30 to the uppermost position illustrated in FIG. 1. It will be appreciated of course that by appropriately shaping camming surface 78, the ratio of the force applied to the punch portion 82 to the force applied by the pallet to the abutment surface 34 of the detent member 18 can be predetermined. Given these constants, the force required to release the load pallet can be accurately controlled by selection of the material and thickness of the fuse plate and of course the diameter of the plug which is to be punched.

With the foregoing general description, the operation of the system will be described in detail.

In the first place when loading a pallet onto the aircraft the foot pedal 60 will be in a depressed position and retained in this position against the force exerted by spring 56 by the kickoff dog 68. The load pallet is then moved into approximate registration with the detent mechanism and the operator kicks off the locking dog 68 with his foot, releasing the pedal 60 for swinging movement to the full line position illustrated in FIG. 5. This has the result of moving the tube 46 and the pin 44 longitudinally from the position illustrated in FIG. 3 through the position illustrated in FIG. 2 to the positive lock position illustrated in FIG. 1. At this time the blocking cam 74 has been shifted to inoperative position. Under the influence of the spring 56 the pin 44 swings the actuating arm 36 clockwise thus inserting the free ends of the detent elements 18 and 20 into the pallet recess 12. If at this time the pallet is not accurately centered with respect to the locking mechanism, the abutment ends of the detents may still enter the recess 12 and be operable to shift the pallet, or the pallet may be otherwise shifted, until the detents are in fully inserted position. If the pallet is to be offloaded in normal operation, the operator simply steps on the pedal 60 which moves the operating arm 36 counterclockwise and retracts the locking portion of the detents from the pallet.

On the other hand if the release mode is parachute controlled the blocking cam 74 is shifted into position where it will be engaged by the pivot pin 40 before the actuating link 33 is in the uppermost position and before the toggle links 26 have passed beyond the overcenter position. This of course is the position illustrated in FIG. 2. At this time the load cell 80 may be swung downwardly into operating position so that its punch portion 82 is engageable by a side of the blocking cam 74, as shown in FIG. 4.

The system is now conditioned for parachute release and as a force is applied to the abutment surface 34 of the detent element 18 by the pallet, a downward force is applied to the link 32 which in turn applies a force to the pin 40 and to cam surface 78 of the blocking cam 74 tending to rotate it clockwise as seen in FIG. 4. This forces the side of the blocking cam 74 against the punch portion 82 of load cell 80 and downward movement of the pin 40 and link 32 and retraction of the detent elements are prevented until the force applied to the punch portion 82 attains a value sufficient to cause the punch to penetrate the fuse plate. At this time inclined slot 42 forces pin 44 to the right as seen in FIG. 4, and swings arm 36 to the dotted line position shown in this figure.

It will be understood that the illustration of the link and lever mechanism illustrated in FIGS. 1-4 is generally schematic. However, in FIG. 2 there is shown a portion of a cover plate provided on the housing 15. If desired this cover plate may be provided with an arcuate slot concentric with pivot mounting 38 and the end of the pin 40 may extend through this slot for movement as the link 32 is moved downwardly by forces applied by the parachute. In such cases of course the load cell 80 may be mounted exteriorly of the housing 15. This provides ready access for replacing fuse plate 112 and also for rocking the load cell into and out of operating position about the axis 83.

I claim:

1. Load locking mechanism for locking a movable load-carrying support in loaded position against movement in an unloading direction, in which the support has a recess at one side thereof having confronting abutment surfaces at the sides of said recess, said mechanism being located at the side of a support when said support is in loaded position, said mechanism comprising a pair of detent members having oppositely facing abutments thereon confronting the abutment surfaces in said recess when in locking position, at least one of said detent members being pivoted for swinging movement of the abutment thereon into and out of the recess, said other detent member being pivotally interconnected with said one detent member and movable therewith to cause the abutments on said detent members to swing into and out of the recess and upon movement thereof into locking position in the recess to move apart and respectively toward the confronting surfaces of the recess to provide for entry into the recess when it is not in precise registration with the locking mechanism.

2. Mechanism as defined in claim 1 in which one of said detent members is positioned to oppose movement of the support out of locked position, and to be urged to unlocking position by forces applied thereto by the support, and a fuse plate and punch device to oppose movement of said one detent member until the force applied to said one detent member by the support attains a predetermined value.

3. Mechanism as defined in claim 1 comprising a pair of toggle links provided together at adjacent ends thereof and pivoted to said detent members adjacent the abutments thereon at the other ends of said links, an actuating link pivoted to the toggle links at the pivot connection therebetween, and actuating means connected to said actuating link to move it between a first position in which the abutments on said detent members are withdrawn from the recess to release the support and a second limiting position in which said toggle links assume an over-center position to provide positive locking of the support in locked position.

4. Mechanism as defined in claim 3, and cam-latch means to limit movement of said actuating link to a position in which said toggle links are retained out of over-center position whereby forces applied by the support to said one detent member apply forces tending to move said actuating link to the position in which said abutments are withdrawn from the recess in the support.

5. Mechanism as defined in claim 4, comprising yielding means connected to said locking mechanism to prevent movement of said detent members to withdrawn position until the force applied by the support to said one detent member attains a predetermined value.

6. Mechanism as defined in claim 5, in which said yielding means comprises a punch and fuse plate device operable to prevent substantial movement of said one detent member until the force applied by the support thereto attains a value sufficient to cause the punch to penetrate the plate of said device and thereafter to oppose only negligible resistance to movement thereof to retract both of said abutments fully from the recess in said support.

7. Mechanism as defined in claim 4, in which said actuating means comprises a lever having one end pivoted to said actuating link, said lever having a slot therein, a pin in said slot movable radially of said lever to swing said lever between locking and unlocking position, said cam-latch means comprising a cam-pin on said lever, a pivoted element engageable in latching position with said cam-pin to limit movement of said lever to a position in which said toggle links are spaced from their over-center position and having a cam surface engaged by said cam-pin when in latching position operable to transmit forces from said cam-pin to said element to urge said element toward unlatched position, and yieldable means opposing movement of said element toward unlatched position until force applied to said one detent member by the support attains a predetermined value.

8. Lock actuating mechanism for moving detent means into and out of locking relation in a recess in a load support, said mechanism comprising a foot pedal, pivot means mounting said pedal, an elongated lock actuating member, a link pivoted between said pedal and member to slide said member longitudinally upon pivoting movement of said lever, resilient means urging said pedal to up position, and a resilient locking dog engageable with said lever in down position and having a kick-off projection extending above said lever to provide for release of said lever by disengaging said locking dog by foot operation of said kick-off projection.

* * * * *